Jan. 24, 1950

J. M. RICHARDS 2,495,288

STEREOSCOPIC ADAPTER

Filed Dec. 15, 1945

INVENTOR.
JOHN MARK RICHARDS
BY
ATTORNEY

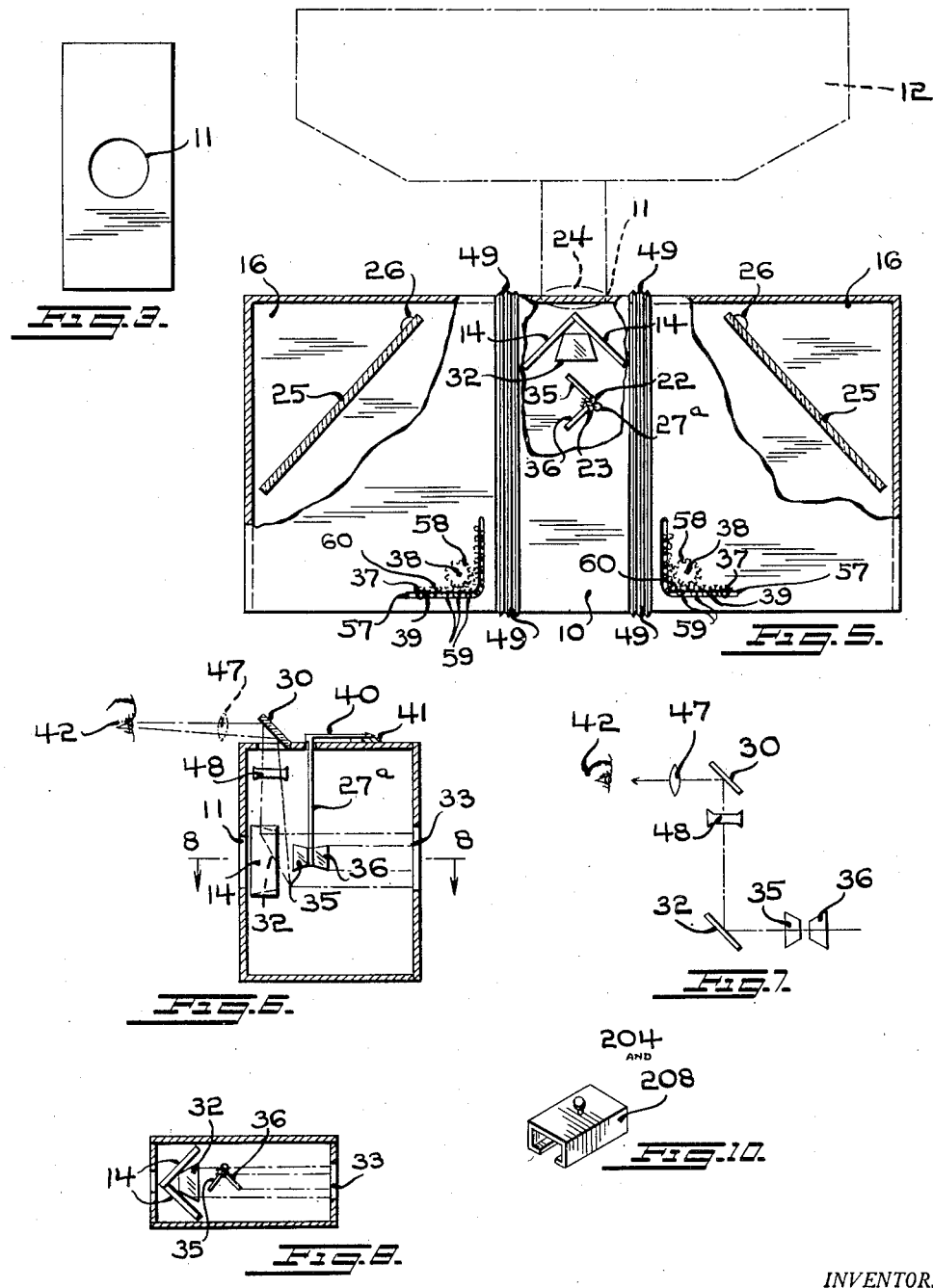

Jan. 24, 1950 J. M. RICHARDS 2,495,288
STEREOSCOPIC ADAPTER
Filed Dec. 15, 1945 8 Sheets-Sheet 3
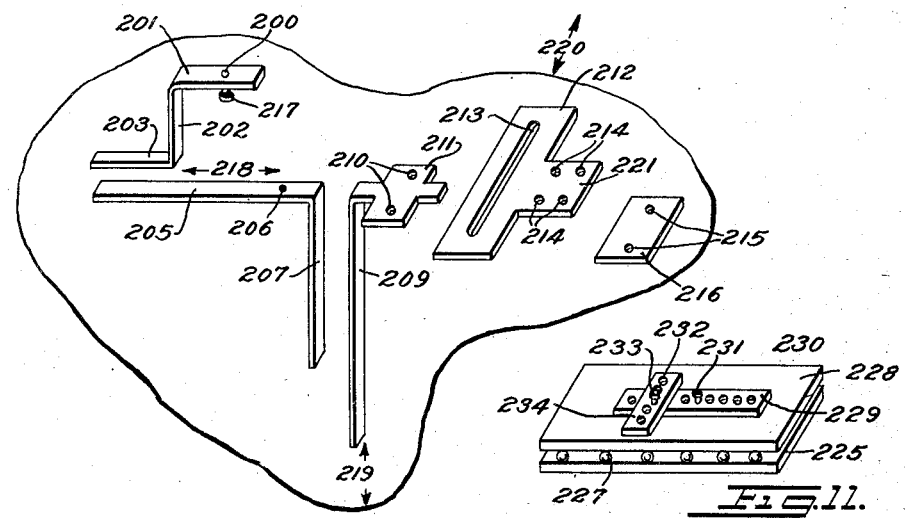
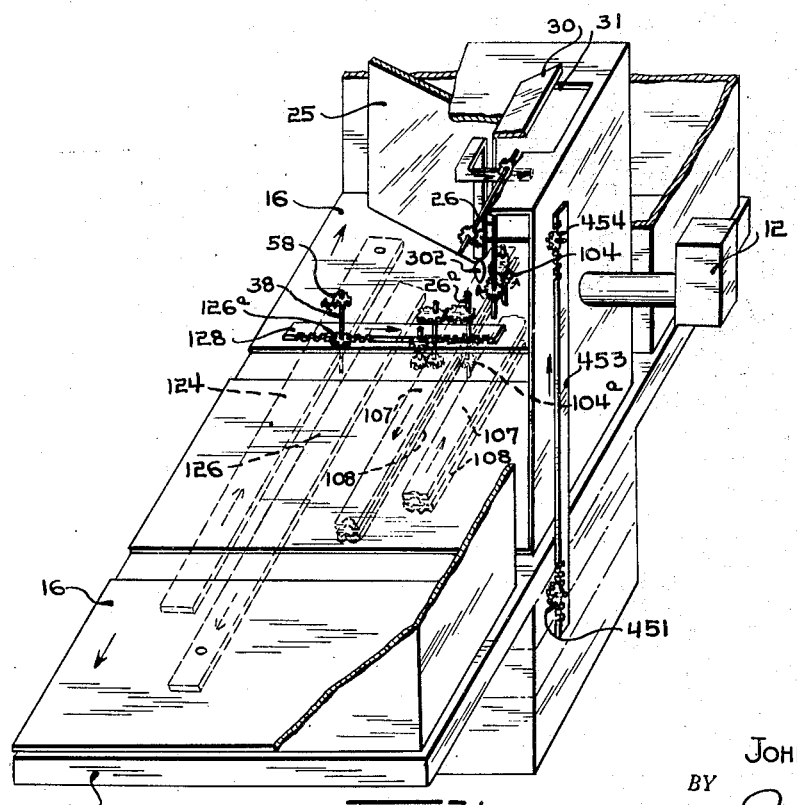
INVENTOR.
JOHN MARK RICHARDS
BY
ATTORNEY Jan. 24, 1950
J. M. RICHARDS
2,495,288
STEREOSCOPIC ADAPTER
Filed Dec. 15, 1945
8 Sheets-Sheet 4
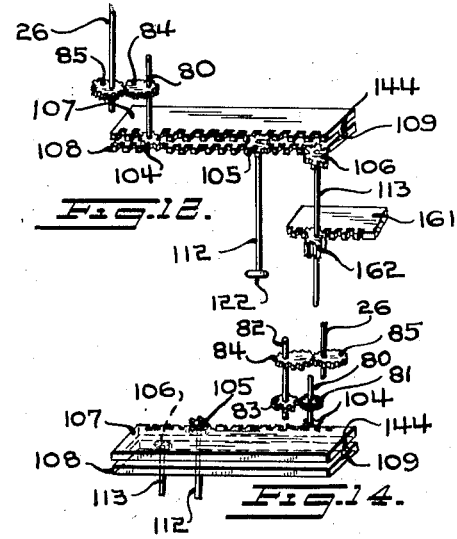
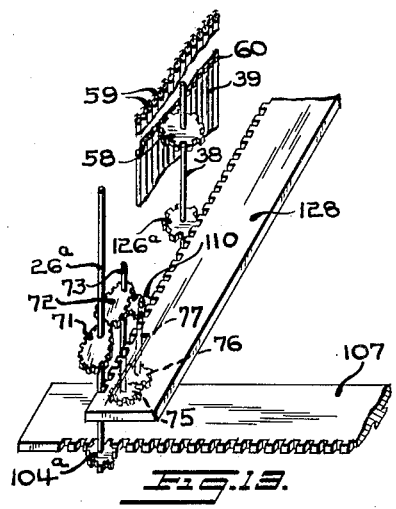
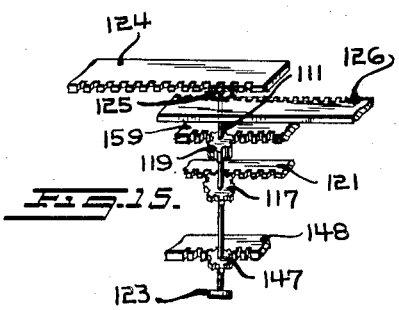
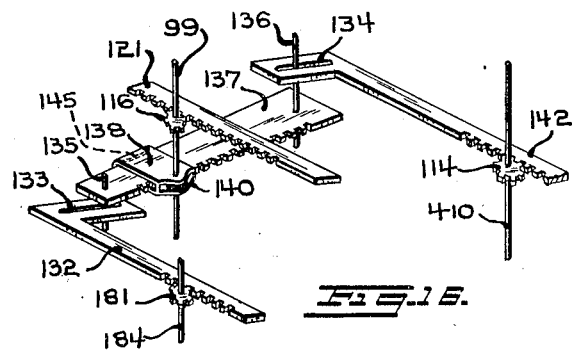
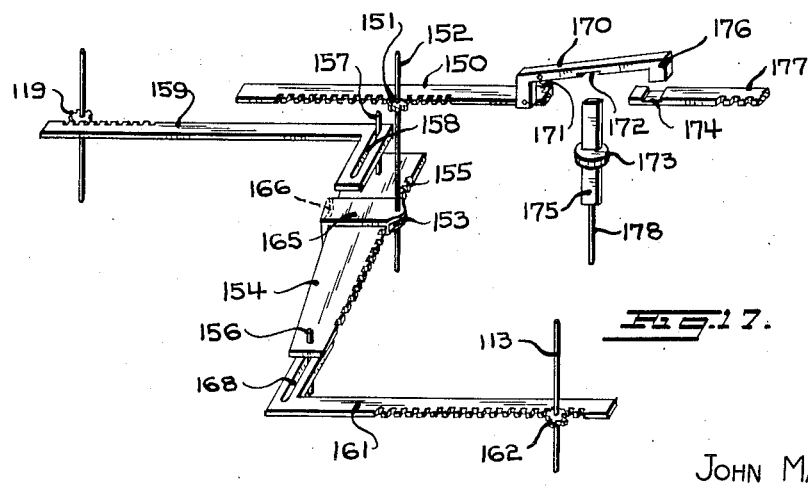
INVENTOR.
JOHN MARK RICHARDS

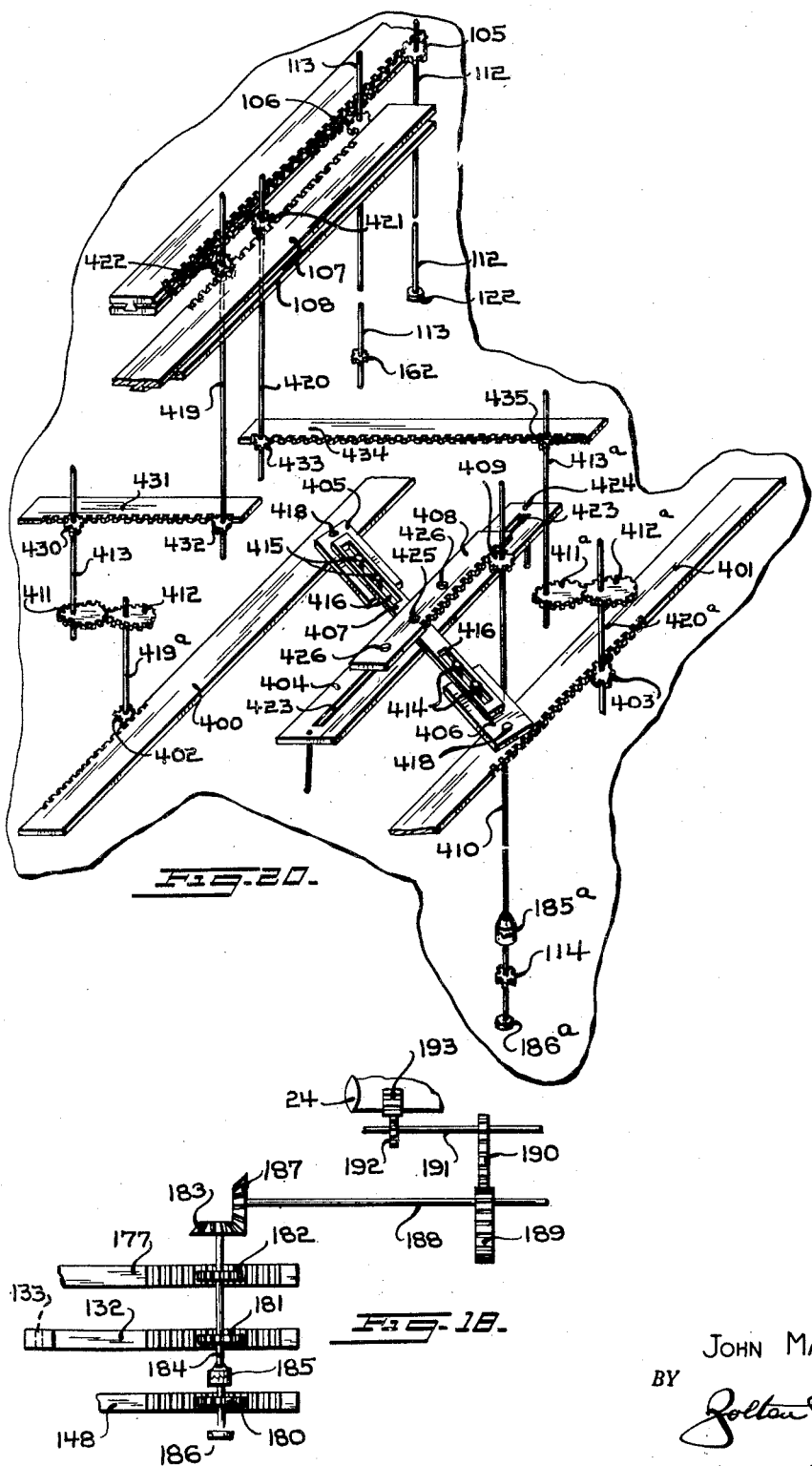

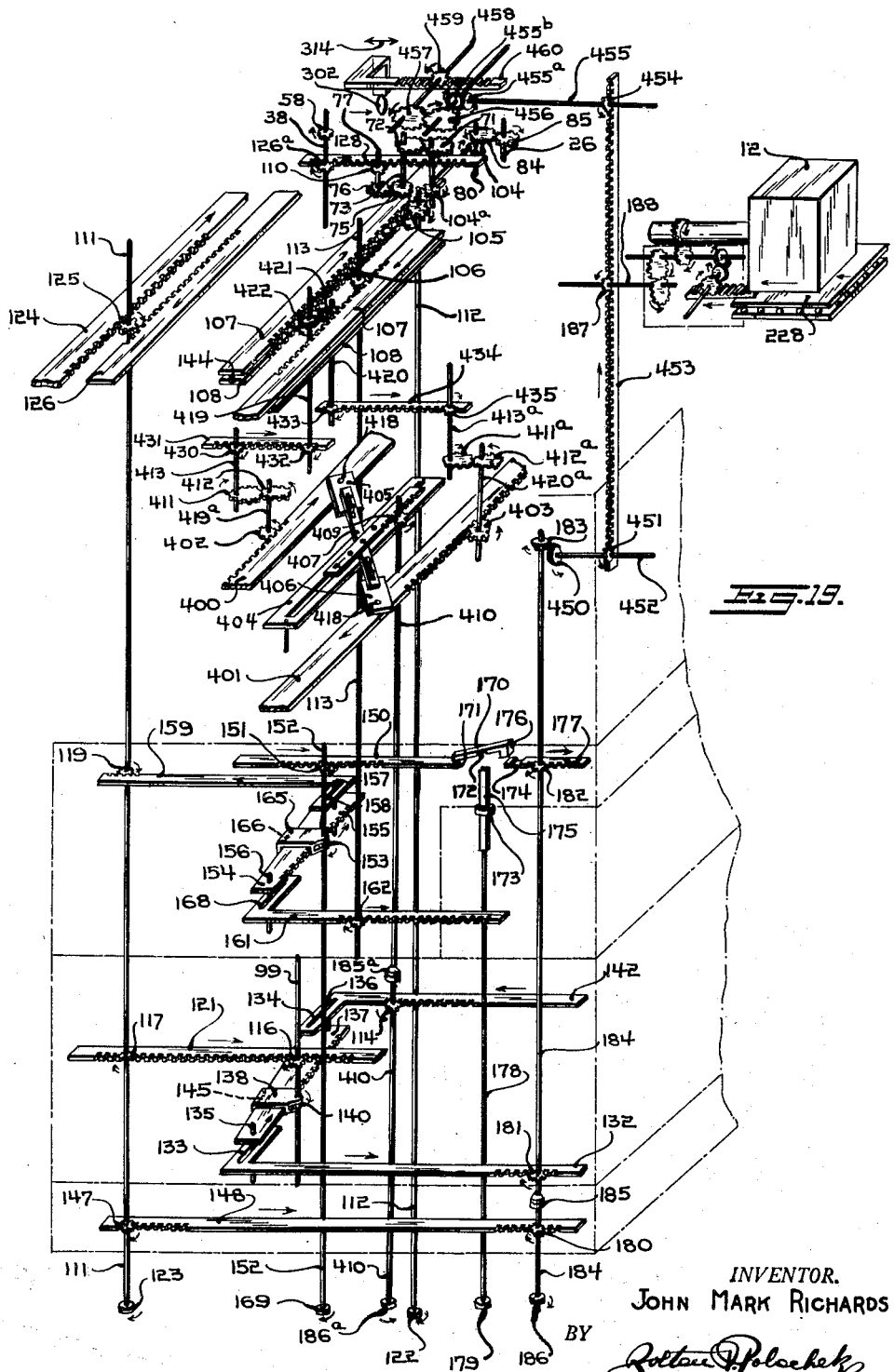

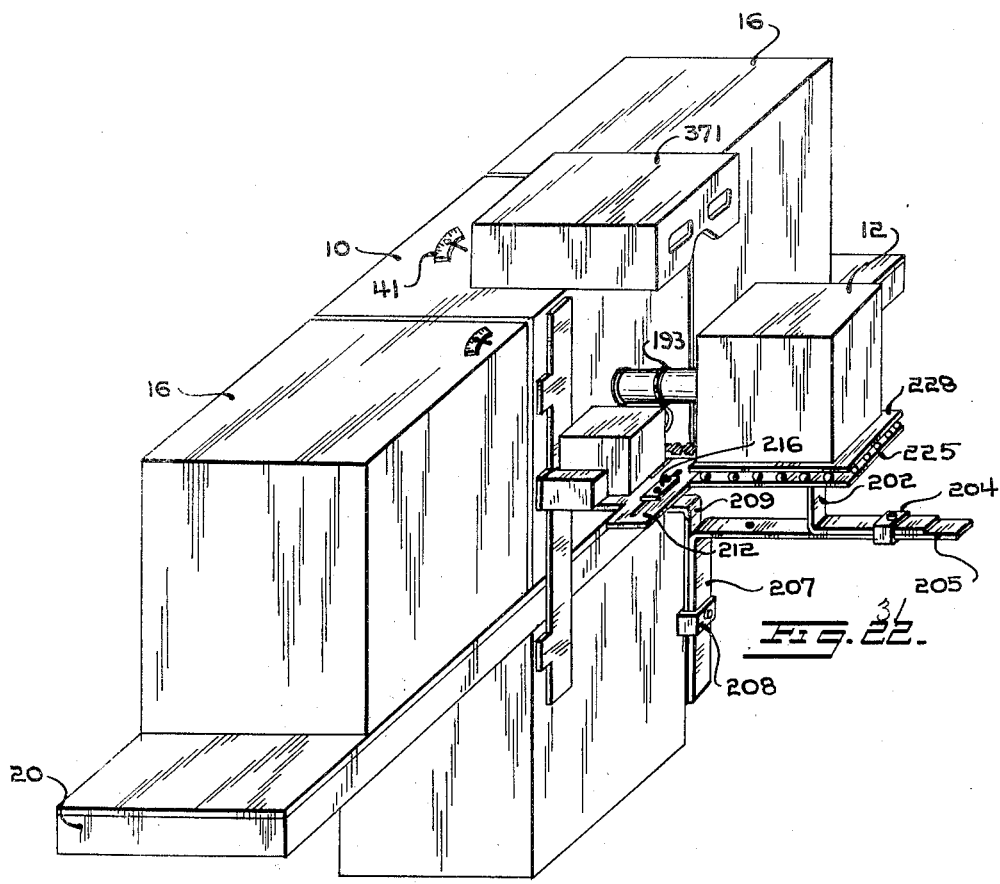

Jan. 24, 1950     J. M. RICHARDS     2,495,288
STEREOSCOPIC ADAPTER
Filed Dec. 15, 1945     8 Sheets-Sheet 8
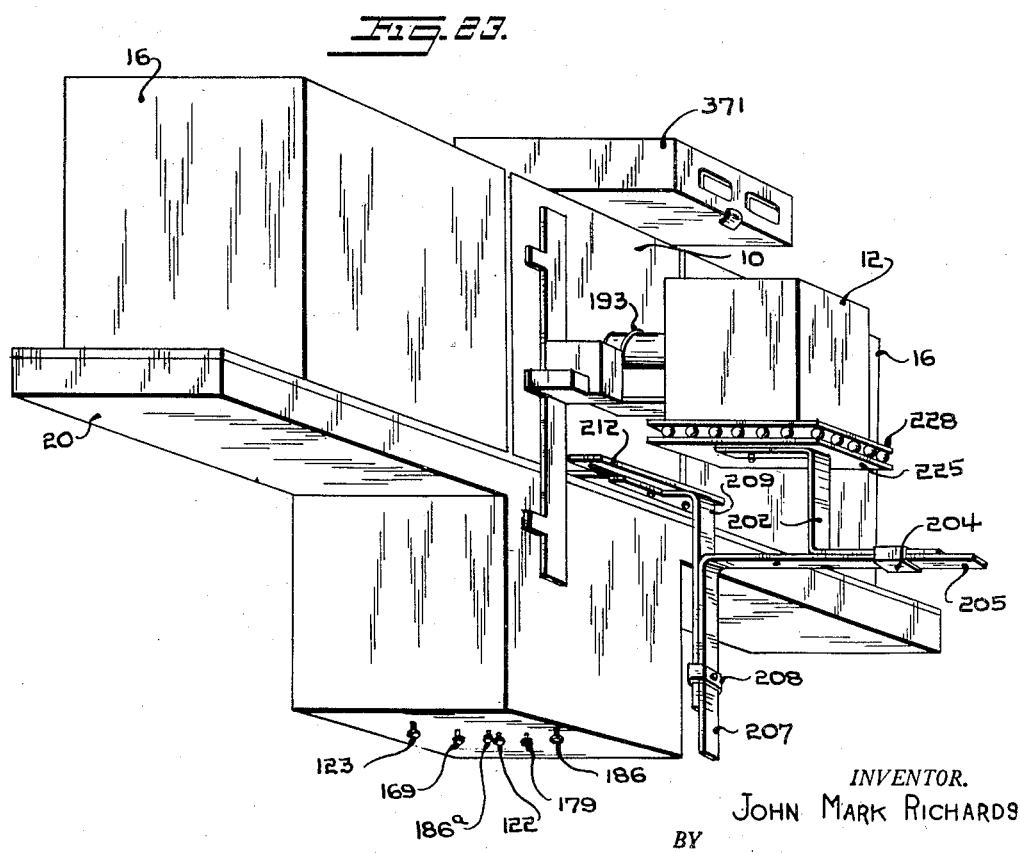
INVENTOR.
JOHN MARK RICHARDS Patented Jan. 24, 1950

2,495,288

UNITED STATES PATENT OFFICE 2,495,288

STEREOSCOPIC ADAPTER

John Mark Richards, New York, N. Y.

Application December 15, 1945, Serial No. 635,276

5 Claims. (Cl. 95—18)

This invention relates to new and useful improvements in a stereoscopic adapter.

An object of this invention is to produce stereoscopic images accurately and easily with all types of single aperture cameras.

At this point certain definitions of terms to be used in the following description are given to enhance the clarity of this description of the stereoscopic adapter of the present invention:

1. The camera lens total angle of view is a composite angle pyramidal in form with a rectangular base consistent in proportions with the two dimensions of the camera image field subtending their respective angles to the optical center of that camera lens system.

a. The camera lens horizontal angle of view is one-half the angle subtended by the longer of the two dimensions of an image area provided by a particular camera image field to its lens optical center. In other words it is usually the angle subtended by the short dimension of one of a pair of stereoscopic images to that particular lens at its focal length.

b. The camera lens vertical angle of view is the angle subtended by the shorter of the two dimensions of an image area provided by a particular camera image field to its lens optical center.

2. The stereoscopic base is that distance separating the two lateral stereoscopic adapter mirrors. (This is obtained by the relative placing of the lateral housings which contain, rotatably mounted, the lateral mirrors.)

3. The stereoscopic angle is the angle subtended by the stereoscopic base to the object distance which perpendicularly bisects this base. This angle forms at the object a point of stereoscopic convergence which is included on the optical axis of the lens in the anterior conjugate focal plane of the lens.

4. The optical axis of the camera lens is similar to that of all lenses. The said optical axis is horizontal and it is in relation to it that certain terms of position and direction are used:

a. Anterior means parallel to the optical axis and facing away from the camera lens.

b. Posterior means parallel to the optical axis and facing the camera lens.

c. Medial means perpendicular to the optical axis and facing the axis horizontally.

d. Lateral means perpendicular to the optical axis and facing horizontally away from the axis.

e. Superior means perpendicular to the optical axis in a vertical direction towards the observer's head (observer is the person taking the picture).

f. Inferior means perpendicular to the optical axis in a vertical direction away from the observer's head.

5. The anterior conjugate focal plane of the lens is the plane of the object perpendicular to the optical axis, in its position relative to the lens for a given image position.

6. The posterior conjugate focal plane of the lens is the plane of the image perpendicular to the optical axis, in its position relative to the lens for a given object position.

More particularly the object of this invention is to make variable conjointly or disjointly, as desired, all the optical elements of stereoscopic picture taking, namely:

1. Camera lens focusing,
2. Camera lens aperture,
3. Stereoscopic base,
4. Stereoscopic angle,
5. Object range finding,
6. Object viewing.

These above mentioned factors are provided with means of synchronization with the range finder such that visual use of the object range finder system provides accurate stereoscopic picture taking, with the above elements in various combinations, accordingly to achieve certain effects, as desired.

Certain other variables associated with the above mentioned elements are provided with means for adjustment. Among these are:

1. Axially centering the camera lens with the stereoscopic adapter.
2. Adjusting for the camera lens angle of view by an equal angular adjustment of the center range-finder mirrors and the lateral mirrors, for each respective side, to the optical axis.
3. Medial masking of the anterior apertures of the lateral housings.
4. Variable masking of the observer's field of view.
5. Focusing of the viewer lens system variably.

In general, there are three separate mirror housing units, a central one and two lateral ones. These housings are maintained at variable stages of separation (stereoscopic base) by a means for simultaneously adjusting the two lateral or side housings towards or away from the central housing.

The central housing is stationary relative to the camera lens and has a posterior central aperture for engaging upon a camera lens in axial alignment. Two center mirrors with planes at right angles to each other with their reflecting surfaces directed posteriorly and laterally in the optical axis of the camera lens, and fixedly mounted within said central housing, are arranged with their contacting edges extended vertically.

The said two center mirrors with planes at right angles to each other and with their reflecting surfaces directed posteriorly and laterally, and fixedly mounted within said central housings and set with their contacting edges extending vertically, can be in either of two arrangements:

1. The first arrangement is one in which the mirrors are set laterally relatively and the contacting edges of the mirrors extends vertically through the optical axis of the camera lens, and the mirrors are both wholly reflecting. This is the preferred type of arrangement.

2. The second arrangement is that one in which the mirrors are set in sequence anteroposteriorly in the optical axis of the camera lens, similarly to the preferred type of center range finder mirrors later described. And also similarly to said preferred center range-finder mirrors, the anterior-more mirror would be fully reflecting and the posterior-more one would be equally reflecting and equally transmitting. In this fashion these mirrors would function similarly to those of the first arrangement, but their contacting edges would extend vertically laterally to the optical axis of the camera lens.

The central stationary housing also contains the center optical elements of an object range-finder system, and an object viewing system arranged to coincide in their extended optical axes with that of the camera lens.

The central stationary housing has anterior and superior apertures for viewing and two lateral ones for stereoscopic picture taking and for use of the range-finder system.

The two side housings are reversely identical, that is, are mirror images of each other. The side housings are disposed laterally to the central housing and have their adjacent sides open. The invention contemplates the provision of means for separately and also simultaneously adjusting the side housings towards and away from the central housing. The side housings are provided with two side mirrors of use both in the stereoscopic adapter camera lens system and the object range-finder system. These mirrors are respectively mounted vertically rotatable in each side housing, and set with their reflecting surfaces anteriorly and medially directed to the optical axis of the camera and placed with their posterior edges lateral to the more posterior edge of their respective center mirrors and forming an angle variable from a maximum of 90° to a minimum of 0° with the optical axis of the camera lens. Means is provided for varying the angles of the side mirrors, simultaneously preferably, but separately for special effects. The side housings have anterior apertures for the reception of rays of light from an object or objects onto their respective side mirrors. These apertures are provided with means for variable medial masking.

With the improved stereoscopic adapter's preferred embodiment, briefly described above, it is possible to vary the spacing between the two side mirrors to selected distances for accommodating different degrees of stereoscopic base separation of the two lateral mirror apertures.

It is also possible to vary the angles of the two lateral side mirrors to the optical axis of the camera for varying the object range of the picture taker and for accommodating different camera lens angles of view.

The two functions just described, varying the stereoscopic base, and varying the angles of the lateral mirrors provide variable stereoscopic angles.

These adjustments of the stereoscopic adapter stereoscopic angle are such that variable stereoscopic depth effects can be attained, namely:

1. Maintenance of normal relations with any lens by a depth effect proportionate to the lens magnification power.

2. Changing normal relations with any lens by:

a. Giving depth effect greater than that proportionate to the actual object distance as taken by the camera lens.

b. Giving depth less than that proportionate to the actual object distance as taken by the camera lens.

The invention also contemplates the association of a novel viewer with the picture taker, allowing no parallax and no angle of view variation between the camera lens total angle of view and the total angle of view of the person taking the picture.

It is also contemplated to provide the adapter with a novel object range-finder synchronized to the stereoscopic adapter for visual adjustment of the stereoscopic images with a given camera lens without necessary reference to angle or distance scales.

It is proposed to provide a scale for synchronizing the range-finder central mirrors adjustment with each change in the lateral mirror angles made necessary by use of a different lens angle of view.

Once this adjustment is made for infinity on said two mirror pairs for a given lens horizontal angle of view (the lens focused at infinity) it will provide accurate visual adjustment of the stereoscopic image positions as desired superimposed, or separated preferably for that lens by simple varying of the angle of the two lateral mirrors according to the distance of an object, at that particular separation of the two lateral mirrors.

It is proposed not only to synchronize separately and simply the separation of the two side housings containing the lateral mirrors, and the rotation of the two lateral mirrors with respect to changing their angles simultaneously with the optical axis of the camera lens, but also to synchronize together these two so that as the side housings and thus the two lateral mirrors are changed in their distance apart (stereoscopic base) the two lateral mirrors will change their angles simultaneously to maintain the object originally focused upon at that stereoscopic point of convergence. This must involve a means of knowing the exact distance focused upon and this is most readily done through the lens focus; that is, a mechanical system is set up to change the ratio between the side housing movements, relative to each other, and the lateral mirror change of angle.

To utilize further features of this invention it is proposed to synchronize also the change of angle of the lateral mirrors due to changing distance of an object with the focusing of the lens upon that same object. This is accomplished through a mechanical system between the lens, and the lateral mirror simultaneous adjustment system.

In order to make this applicable to different distances of separation (stereoscopic bases) of the two side housings (and lateral mirrors) a mechanical system is set up for simultaneously moving the side housing system to change the ratio of movement between the lateral mirrors simultaneously with changing of angles system and the lens focusing system.

In order to allow use of said lens mirror system while the lateral housings are being actively separated in said housing mirror system, the mechanical synchronization must focus the lens only according to the stereoscopic point of convergence, and this synchronization thus must permit said housing mirror system to give its own angulation to said lateral mirrors, appropriate for said lateral housing separation and said stereoscopic point of convergence without directly changing the lens focus, while said lens mirror system is used to provide a variable stereoscopic point of convergence and an appropriate lens focusing.

The synchronizations listed thus far allow alternate adjustment of the side housing separation with a variable object distance, and of the "lens focusing-changing object distance simultaneously angular adjustment of the two lateral mirrors" system (later described as the lens-mirror-housing system).

It is well to note here that when adjusting the above mechanical systems, before the lens focusing is set in gear at infinity, the central range-finder mirrors and those serving as lateral range-finder mirrors (preferably the two lateral mirrors of the side housings or others synchronized with them) should be set each from the angle 45° to the optical axis, closer to the optical axis by an angle equal to ¼ the lens horizontal angle of view. For special close work where a practical change in the angle of view of the lens occurs, a similar readjustment must be made.

It is proposed also to synchronize simultaneously the lateral housing change of stereoscopic base and the lateral mirror rotations, such that once a given stereoscopic angle is set for by separate adjustment of the lateral housing separation and of the lens focusing-lateral mirror angle adjusting system for a given object distance, then that given stereoscopic angle is maintained for all object distances to the maximum and minimum limits of that lateral housing separation (stereoscopic base) mechanism, after which limits the synchronization to maintain the given stereoscopic angle automatically ceases and only the lens focusing-lateral mirror angle adjusting system functions, for that maximum or minimum fixed separation of the lateral housings.

There are four optical systems involved in this invention in combination and separately:
1. The simple one of the camera lens.
2. The stereoscopic adapter,
3. The range finder, and
4. The object viewer.

In the camera lens system, the lenses considered are those of all types including those of lens angle of view known as wide angle and telephoto lenses, of varying apertures and focal lengths.

In the stereoscopic adapter system there are (excluding the camera lens) four mirrors involved, in two laterally displaced mirror-image formations. The center mirrors are of proper size to accommodate the above mentioned camera lenses. The lateral mirrors are of proper size to accommodate the above mentioned camera lenses. The lateral mirrors are of proper size to accommodate these same lenses of all different apertures and focal lengths at all desired separations of the side housings (and lateral mirrors), and at all variations of those lateral mirror angles for a given lens or a given object distance.

Housing apertures are of course arranged accordingly to accommodate these same camera lens angles and the mirror sizes laterally.

Adjustable masks for the medial sides of the anterior apertures of the lateral housings are provided. Each mask is set into the aperture to such a distance as to approximate the medial edge of the useful field of lens horizontal angle of view. This medial edge is the same for all lenses relative to the lateral mirror position of rotation and therefore must be adjustable for each rotation of the lateral mirror to keep at this edge. This is done to prevent center overlapping of stereoscopic images. Each mask is synchronized with its lateral mirrors' rotation to keep at the edge of said angle of view and thus to move medially as the mirror rotates medially and laterally as the mirror rotates laterally.

No change is needed as the lateral housings separate; only as the lateral mirrors rotate. The only exception to this is one in which an initial adjustment separate from lateral mirror rotation may be made to mask some of the excessively overlapping stereoscopic image rays encountered with lenses having large apertures. The adjustment here is relative to the lens aperture, after which setting, the previously described synchronization of the lateral mirror rotation to the mask applies.

In the object range-finder system two central adjustable range-finder mirrors are used. They are placed just anterior to the center stereoscopic adapter mirrors and are in the extended optical axis of the camera lens. These said mirrors may be of the split image type or the superimposed image type, the former saving space and allowing less horizontal dimension of the lateral range-finder mirrors (preferably synonymous with the lateral mirrors of the stereoscopic adapter system).

Housing apertures are of course arranged accordingly to accommodate these same camera lens angles and the mirror sizes laterally. Adjustable masks for the medial sides of the anterior apertures of the lateral housings are provided. Each mask is set into the aperture to such a distance as to approximate the medial edge of the useful field of lens horizontal angle of view. This medial edge is the same for all lenses relative to the lateral mirror position of rotation and therefore must be adjustable for each rotation of the lateral mirror to keep at this edge. This is done to prevent center overlapping of stereoscopic images. Each mask is synchronized with its lateral mirrors' rotation to keep at the edge of said angle of view and thus to move medially as the mirror rotates medially and laterally as the mirror rotates laterally.

No change is needed as the lateral housings separate; only as the lateral mirrors rotate. The only exception to this is one in which an initial adjustment separate from lateral mirror rotation may be made to mask some of the excessively overlapping stereoscopic image rays encountered with lenses having large apertures. The adjustment here is relative to the lens aperture, after which setting, the previously described synchronization of the lateral mirror rotation to the mask applies.

In the object range-finder system two central adjustable range-finder mirrors are used. They are placed just anterior to the center stereoscopic adapter mirrors and are in the extended optical axis of the camera lens. These said mirrors may be of the split image type or the superimposed image type, the former saving space and allowing less horizontal dimension of the lateral range-finder mirrors (preferably synonymous with the lateral mirrors of the stereoscopic adapter system).

If the latter range-finder system is used the more posterior mirror is equally reflecting and transmitting and the more anterior one is totally reflecting. Both mirrors are preferably front surfaced as are all mirrors in this invention. The center range-finder mirror anterior edges are placed posterior to the anterior edges of the lateral range-finder mirrors by a distance sufficient to prevent loss of the object reflection into said center mirrors from said lateral ones at maximum angulation of said lateral ones in adjustment for any given lens angle of view or object distance or any desired stereoscopic base. And conversely, the lateral range-finder mirrors must be of such size as to provide object rays to the center mirrors respectively under the said conditions.

The lateral range-finder mirrors are synchronous with, or preferably identical with the lateral mirrors of the stereoscopic adapter system. It is preferred that they be identical with them in order to provide more ready superimposition of the camera object with that viewed by the picture taker (observer). Also the lateral mirrors are to be used thus if the range-finder is to allow ready observation in the optical axis of the camera lens as is preferred.

Provision of an object range-finder system which gives the observer a total field of view through it equivalent to that of the camera lens total angle of view is contemplated.

In this full angle of view range-finder system there is no basic change, except in viewing, from that just described. The center range-finder mirrors must provide adequate dimensions as also must the lateral range-finder mirrors (preferably identical with the lateral mirrors of the stereoscopic picture-taker optical system), in order to include the observer's full (total) angle of view. Here the range-finding system providing superimposition of images is used.

The center housing anterior viewing aperture is not used for viewing, but rather the lateral housing anterior apertures are.

For viewing through this full angle of view range-finder system a special arrangement is provided so that the observer may here use both eyes and obtain not only accurate superimposition of range-finder images, but also the full stereoscopic effect of the stereoscopic adapter as being recorded in the camera by its stereoscopic images.

The said special stereoscopic viewing arrangement includes the use of polarizing devices to plane-polarize oppositely the stereoscopic image rays coming from the two lateral mirrors respectively towards the two central range-finder mirrors. These polarized rays are carried into the optical axis of the camera lens briefly in a posterior direction through a lens system which is focused preferably by means synchronizing it to the camera lens focusing, and then the polarized rays are deflected superiorly to a polarizing screen (transmitting preferably) where the stereoscopic images are focused superimposed upon the screen by proper adjustment of the range-finder mirrors for that particular object. The stereoscopic oppositely plane-polarized images can be viewed erectly on this polarizing screen through suitable polarizing analyzers arranged to coincide with the respective polarizers on that same side. One of the polarizing analyzers has preferably a small center area non-polarizing so that double images are appreciated by this eye for that area view of the superimposed images. This allows accurate superimposition of the stereoscopic images through this small central area while the rest of the images can be received in full stereoscopic relationship by both eyes of the observer. This central area lacking polarization may be replaced by a polarizing area as desired for special stereoscopic work where object range-finding has already been done.

More particularly, a system of polarizing analyzers for obtaining enlarged concise images of the polarizing screens stereoscopic images is presented. This system comprises an equally reflecting and transmitting front surfaced mirror near the polarizing screen which reflects rays from the screen at right angles to the optical axis to a completely reflecting mirror, which directs the rays through the polarizing analyzer and a magnifying lens to the observer's eye on that side.

Another completely reflecting mirror is placed behind the previously described equally reflecting and transmitting mirror to receive the transmitted rays which are then reflected laterally to another completely reflecting mirror and thence through the polarizing analyzer and a magnifying lens to the observer's eye on that side.

These magnifying lenses, polarizing analyzers, and mirrors nearest to them are adjustable medio-laterally for different interpupillary distances of different observers' eyes by suitable means.

In order properly to mask the angle of view of the observer to coincide with that of the camera lens angle of view, adjustable masking of the polarizing screen is provided.

In the previously described polarizing object range-finder and viewing system, instead of a polarizing screen to intercept the polarized, erectly viewed real images, for viewing by the observer perpendicularly towards the optical axis of the camera lens, an optical system providing polarized erectly viewed virtual images is proposed. In this said system there is no essential change from the previously described polarizing system except for the said substitution. Any optical system providing said erect virtual image can be utilized in lieu thereof. It is preferable, however, to use some system providing a wide angle of view. Thus an inverted telescopic system is preferred.

If the observer's line view is parallel to the optical axis, an inverted Galilean, or terrestrial telescopic optical system may be used; or if his view is perpendicular towards the optical axis, an inverted astronomical type would be preferred to keep the image erect to the observer. The same method of polarizing the respective image rays of light pertains and the same type of mirror interposition as is convenient to transpose the axis to the level of the observer's eyes is to be used. The binocular polarizing analyzer system has its magnifying lenses replaced by the appropriate part of the inverted telescopic system which now acts as oculars. The more anterior part of said telescopic system is then synchronized with the focusing of the camera lens in order to provide an image always focused on the desired object.

The problem of whether the observer is to do his viewing in a line perpendicular to the optical axis of the camera lens (vertically), or whether he is to do it parallel to said axis (horizontally), resolves itself into a consideration of whether the particular optical system used for presenting an image to the observer's eyes gives an erect or an inverted image, the former having to be viewed horizontally and the latter vertically. Thus, this problem is easily solved as desired with commonly known optical systems for this purpose. No particular preference is made in this invention, various types being described.

In the view finder system which is aligned in the extended optical axis of the camera lens to prevent parallax, the range-finder central mirrors and their image rays may instead of including the whole angle of view, provide merely the center of the field of view especially with wide angle-lenses.

The center range-finder mirrors instead of being supported by view-obstructing rods, preferably are transparent and large enough to cover the whole finder angle, except for only a central small viewing angle area of their surfaces provided with means of reflection for use as range-finder mirrors. This would allow unobstructed passage of light around the central small viewing angle made opaque antero-posteriorly by the means of providing reflection in the range-finding system, and this unobstructed light would comprise the periphery of the field of view of the observer, corresponding to the limits of the peripheral field of view of the camera.

This peripheral view comes directly in along the optical axis (undeflected) of the camera lens through the anterior viewing aperture of the center-housing and it is supplemented by the central part of the field of view from the central range-finder mirrors after which it is deflected superiorly by an interposed mirror to another one at the level of the observer's eye whence it is reflected posteriorly into his eye. An inverted (or even an opposite type to give magnified images) telescopic lens system (terrestrial for horizontal and astronomical for vertical viewing) may be interposed around the last mentioned mirrors for more convenient image size. The anterior aperture of the viewing system in the anterior part of the central stationary housing provides means for changing the rectangular field of view of the observer accordingly to that of the camera. This may be done by a series of masks for the aperture, or by an adjustable mask capable of constricion in meridians perpendicular to the four sides of the rectangle, or by a fixed mask capable of being placed at varying distances from the observer's eye.

An adjustment system mechanically arranged for accurate alignment axially of the camera lens and the stereoscopic adapter is presented.

This system is a simple one for adjusting the one relative to the other in directions mediolaterally, supero-inferiorly, or antero-posteriorly.

Superimposed upon the said adjustment system for axially aligning the camera lens into the stereoscopic adapter central housing posterior aperture is a simple antero-posterior adjusting system allowing free antero-posterior movement of the camera box and image plane relative to the lens upon the antero-posterior adjustment arm of the said lens axial adjustment system. This latter camera box antero-posterior adjustment relative to the camera lens is important in its maintaining of the camera lens in the posterior aperture of the central housing, for this prevents movement of the lens away from the central mirrors of the stereoscopic picure taking optical system with consequent loss of the more peripheral rays of light from the object field.

Except for the camera lens aligning aperture, the lateral housing anterior apertures (excepting the medial masks), the viewing aperture in the anterior part of the center housing, and the observing aperture in the superior side of the center housing, the stereoscopic adapter allows no entrance of light nor exit of light. This is obtained by use of a bellows arrangement between the side housings and the central housing, and firm opaque material covering all other areas except the above mentioned apertures.

In summary, that which is set forth, in main, is briefly a stereoscopic adapter providing:

1. A variable stereoscopic base.
2. A variable stereoscopic point of convergence.
3. A fixed stereoscopic base with a fixed stereoscopic point of convergence.
4. A variable stereoscopic point of convergence with a variable stereoscopic base.
5. A fixed stereoscopic point of convergence with a variable stereoscopic base.
6. A variable stereoscopic point of convergence with a fixed stereoscopic base.
7. A variable separation of stereoscopic camera images, including superimposition.
8. Accurate separation of stereoscopic images for all different focal length lenses in proportion to their lens horizontal angle of view.
9. Prevention of stereoscopic image medial overlap, for all aperture lenses, and prevention of lateral restriction of stereoscopic images.
10. Maintained separation of stereoscopic images for varying object distances.
11. Maintained separation of stereoscopic images for varying object distances with all focal length lenses.
12. Maintained separation of stereoscopic images for varying object distances with all focal length lenses, while maintaining simultaneously a variable stereoscopic base.
13. Maintained camera lens position in its aperture at the stereoscopic picture taker while focusing the stereoscopic images by variation of the camera film image plane relative to the lens position.
14. A variable object field angle of view of the observer equal to that of the camera lens total angle of view.
15. A variable object field angle of view of the observer exactly superimposed upon that of the camera lens total angle of view, thus allowing no parallax.
16. A variable object field angle of view of the observer exactly superimposed upon that of the camera lens total angle of view, thus allowing no parallax, and including an inverted telescopic viewing optical system.
17. An object range-finder optical system of which the stereoscopic adapter optical systems lateral mirrors provide an integral part.
18. An object range-finder optical system whose lateral mirrors are capable of synchronous movement with the lateral mirrors of the stereoscopic adapter's optical system.
19. An object range-finder optical system viewed coincidently with the extended optical axis of the camera lens, allowing no parallax between them.

20. An object range-finder optical system viewed as a central supplement to the total field of view of the object field angle of view of the observer, coincident with that of the camera lens total angle of view.

21. An object viewer and range-finder combined optical system including a magnifying inverted telescopic optical system, all coincident in optical axes with the extended optical axis of the camera lens.

22. An object range-finder optical system capable of accurate adjustment to the lens angle of view for maintained visual adjustment of accurately separated stereoscopic images.

23. An object range-finder and full stereoscopic depth, non-parallactic viewing system for accurate object range-finding for all object distances, stereoscopic bases and different lens angles of view, with simultaneous full stereoscopic depth viewing equivalent in image and angle to those stereoscopic images formed by the camera lens.

24. An integrated non-parallactic object viewer and range-finder optical system for accurate visual adjustment of the stereoscopic image separation and depth, and the lens focus; while varying the stereoscopic base with a fixed stereoscopic point of convergence.

25. An integrated non-parallactic object viewer and range-finder optical system for accurate visual adjustment of the stereoscopic image separation and depth, and the lens focus; while varying the stereoscopic base with a varying stereoscopic point of convergence to maintain a fixed stereoscopic angle.

26. An integrated non-parallactic object viewer and range-finder optical system for accurate visual adjustment of the stereoscopic image separation and depth, and the lens focus; while varying the stereoscopic base with a varying stereoscopic point of convergence to vary the stereoscopic angle.

27. An integrated non-parallactic object viewer and range-finder optical system for accurate visual adjustment of the stereoscopic image separation and depth, and the lens focus; while maintaining the stereoscopic base static and varying the stereoscopic point of convergence.

28. Elimination of undesired extraneous light between housings, and providing variable or static separation of stereoscopic images by accurate visual adjustment of an integrated, non-parallactic object range-finder and viewer optical system mechanically with the variable stereoscopic base, the variable stereoscopic point of convergence, and the variable lenses focusings and angles of view for a given object.

For further comprehension of the invention and of the objects and advantages thereof, reference will be had to the following description and accompanying drawings, and to the appended claims in which the various novel features of the invention are more particularly set forth.

In the accompanying drawings which are a material part of this disclosure:

Fig. 3 is the removed posterior wall of the center housing, showing its aperture.

Fig. 5 is a horizontal diagrammatic sectional view taken on the level of the line 5—5 of Fig. 4, a camera being indicated in dot-dash lines.

Fig. 6 is a diagrammatic side view of the central housing showing the relation of its optical elements and the path of the rays of light to the observer's eye.

Fig. 7 is similar to Fig. 6, but less detailed and showing only the optical elements of the viewer and range-finder system of the central housing.

Fig. 8 is a diagrammatic horizontal sectional view of the center housing taken at a line 8—8 in Fig. 6, and showing the course of the light rays in the periphery of the viewer field from the anterior aperture of the center housing, in the plane of line 8—8.

Fig. 9 is a diagrammatic perspective view of the elements for adjusting the camera lens into axial alignment with the stereoscopic adapter at its center housing posterior aperture.

Fig. 10 is a perspective view of one of a pair of adjustable clamps shown in position in Fig. 22.

Fig. 11 is a perspective view of a moving platform for use in anteroposterior adjustment of the camera box relative to the lens position, to be used with the structure of Figs. 9–10.

Fig. 12 is a diagrammatic view of one-half of the oppositely paired racks with gears, controlling and leading from one lateral mirror rod.

Fig. 13 is a diagrammatic perspective view of the mechanical system synchronizing the lateral mirror movement to that of the lateral housing anterior aperture medially masking curtain.

Fig. 14 is the other half of the oppositely paired rack and gear system, for the other lateral mirror.

Fig. 15 is the diagrammatic sketch of the oppositely paired rack and gear system used in separating the lateral housings, with some of the immediate gearings leading to it and away from it.

Fig. 16 is the diagrammatic system showing one method for the synchronizing mechanism between the lateral mirror gears and the lens focusing gears as adjusted by the housing separation ratio gears.

Fig. 17 shows the lens focus regulated ratio gearing between the system providing adjustment of the lateral mirrors by synchronization with the housing separation adjustment.

Fig. 18 is a diagrammatic view of the mechanical elements immediately synchronized with the lens focusing gearing.

Fig. 19 is a diagrammatic perspective view of the main elements of the various mechanical synchronizations between parts in accordance with the main embodiment of this invention.

Fig. 20 is a diagrammatic perspective view of the mechanical system allowing camera lens focusing with proportionate angulation of the lateral mirrors to obtain a variable stereoscopic point of convergence, regardless of the separation, passive or active, of the lateral housings.

Fig. 21 is a fragmentary perspective view of the housings for the optical systems to show the relation between the housings and their related mechanical system which are more exhaustively shown in Fig. 19.

Fig. 22 is a perspective view from above obliquely of the preferred embodiment of this invention showing the working relationships of its main units.

Fig. 23 is similar to Fig. 22 but its perspective is from below obliquely.

Figures 1, 2, 4:
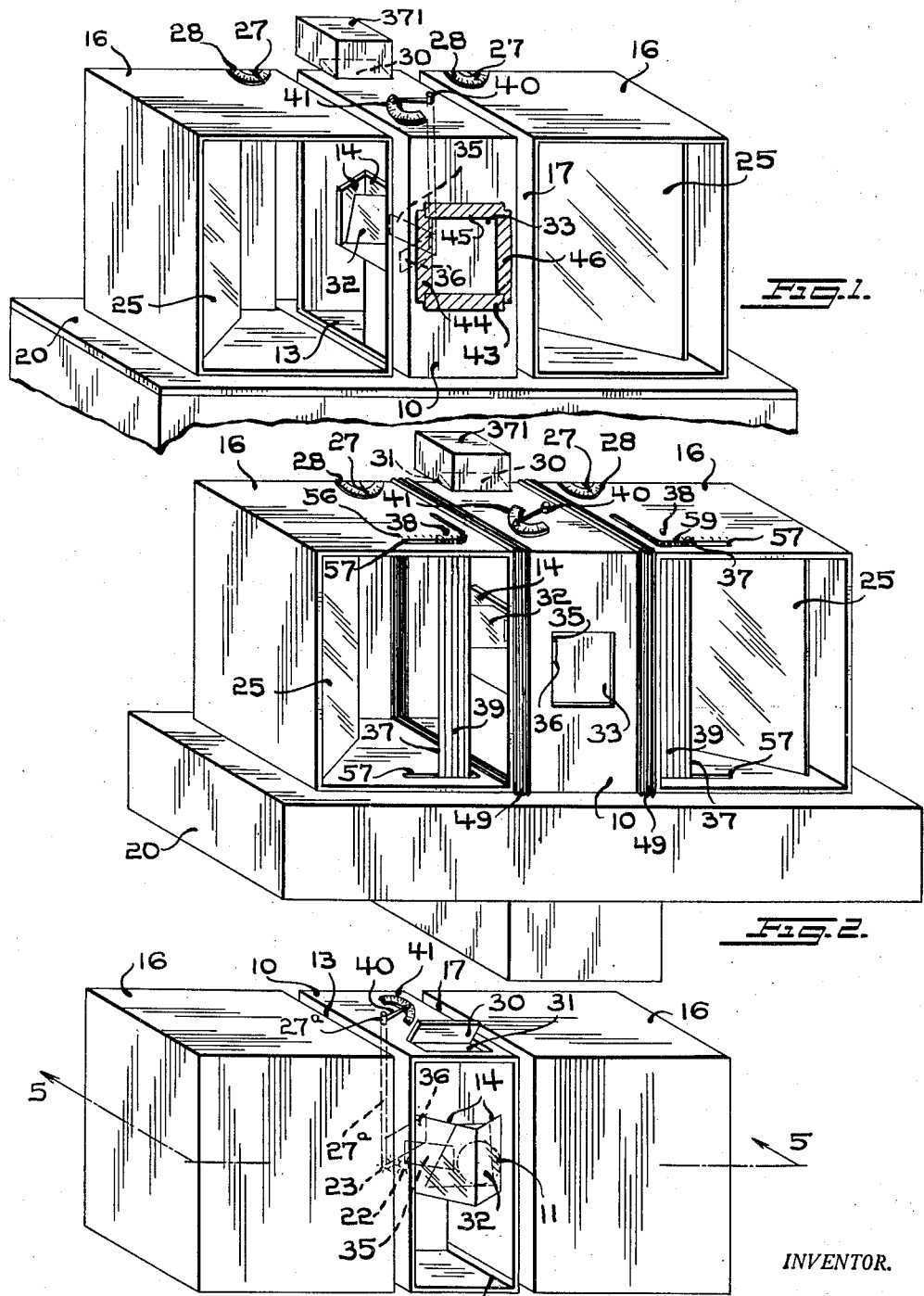
Fig. 1 is a fragmentary perspective view of the stereoscopic adapter showing the housings and mirror systems in accordance with the principal embodiment illustrating this invention, and viewed from the front, obliquely down.
Fig. 2 is a fragmentary perspective view of the stereoscopic adapter showing the housings and mirror systems in accordance with this invention, and viewed from the front, obliquely down. It also shows the medial masking of the lateral housing anterior apertures and a viewing box, but is without the central housing's anterior aperture viewing mask.
Fig. 4 is a fragmentary perspective view similar to Fig. 1, but illustrating a rear view with the back wall of the center housing removed.

The stereoscopic adapter in accordance with this invention includes a central stationary housing 10, having a posterior central aperture 11 (Fig. 3) for engaging upon the lens 24 of a camera 12 (Fig. 5). The housing has open sides 13 laterally, an anterior viewing aperture 33, the aforementioned posterior lens engaging aperture 11, and a superior observing aperture 31. The other surfaces are lightproof.

Two central mirrors 14 (Fig. 4) at right angles to each other, with their reflecting surfaces directed posteriorly and laterally are fixedly mounted along the optical axis of the camera line 24 within said housing 10 with their contacting edges arranged to extend vertically.

Side housings (lateral housings) 16'—16 are disposed to the sides of the central housing 10. These side housings have their medial sides 17 open. The adjacent open sides 17 and 13 of the lateral housings and center housing respectively are connected together by bellows 49 (Fig. 2) or a similar light opaque extensible arrangement for preventing external light from entering these areas extraneously.

These side housings 16 are associated with means (Figs. 15 and 21) for simultaneously adjusting them towards or away from the central housing 10. More particularly one of the side housings 16 is provided with a rack 126 which is parallel and posterior to another rack 124.

These racks 126 and 124 are maintained laterally movable in parallel relationship, on a supporting base plate 20 which is fixedly attached to the central housing 10. This plate 20 extends beneath the side housings 16, for the full extent of the travel of the side housings.

The plate 20 is provided with guides through which the racks 126 and 124 are kept parallel and moving perpendicularly to the vertical plane of the optical axis of the camera lens 24.

A rod 111 (Fig. 7) is rotatively mounted perpendicularly and extending inferiorly through the base plate 20. This rod is the axle for a system of gears and racks intimately related to the function of moving the lateral housings 16 away from and towards the center one 10. The most inferior end of the rod 111 is provided with a handle 123 as a means for manual turning. The most superior end of the rod 111 is provided with a gear 125 for simultaneously meshing with the opposed racks 124 and 126 in order to adjust the lateral housings 16 separation. The intermediate portion of the rod 111 is provided with gears 119, 117, and 147 for synchronous adjustment respectively of the angles of the lateral mirrors 25 angle, the ratio lever 137 between the lens focusing system, and the lateral mirror angulation system, Fig. 16, and lastly the lens focus (Fig. 19). Gears 119, 117 and 147 mesh respectively with the rack 159, rack 121 and rack 148, for the above described purposes.

Two side mirrors (lateral mirrors) 25 (Fig. 1) are mounted within said side housings 16 and are set with their reflecting surfaces anteriorly and medially directed to the optical axis of the camera lens 24 (Fig. 5) and are placed laterally to the said two center mirrors 14.

These two lateral mirrors 25 usually form an angle equal to or less than 45 degrees to the optical axis of the lens 24 of the camera 12 (Fig. 5). These side mirrors 25 are mounted upon vertical rods 26 Fig. 8 which are rotatably mounted in the lateral housings 16. These side mirrors 25 are mounted at their most posterior edges to these vertical rods 26. By adjusting the pointers 27 (Fig. 2) it is possible to change the angles of the side mirrors 25 and by consulting the scales 28 it is possible to set the side mirrors 25 to the same angular positions.

A mechanical means Figs. 12 and 14, is provided for simultaneously adjusting the lateral mirrors 25 to the same angular positions after the initial manual adjustment for that particular lens has been made and a gear 105 is in mesh with a rack 107 for this purpose.

More particularly, the rotatable rods 26, upon which are fixedly mounted the lateral mirrors 25, have at their inferior ends systems of gears providing graded variable movement of said lateral mirrors 25 translated from a constant rate of movement of rack 107. Specifically, one rod 26 (Fig. 14) has at its inferior end a gear 85 which is eccentric and meshes with another eccentric gear 84 on rod 82. To rod 82 is fixedly attached gear 83 which meshes with gear 81 which through rod 80 turns gear 104. Gear 104 meshes with rack 107 and thus transmits indirectly any motion from rack 107 to rod 26 and mirror 25. In order to cause opposite rotation of the two mirrors 25 on their respective rods 26, in the gear system of the other side gears 81 and 83 and rod 82 are omitted and eccentric gear 84 is fixedly mounted on rod 82 with which it turns and meshes with eccentric gear 85 (Figs. 12 and 19).

Racks 107 and 108 Fig. 9 are respectively paired racks opposed to each other, moving oppositely and lying in parallel axes perpendicular to the vertical plane of the optical axis 21. The racks 107 have a ridge 144 which fits into a groove 109 in the racks 108. The adjustment is such that movement of rack 108 carries rack 107 exactly with it, but movement of rack 107 primarily does not move rack 108. Thus turning of the gear 105, which meshes with rack 107, provides movement of rack 107 and consequent rotation of rod 26 without movement of the rack 108 whereas turning of a gear 106 which meshes with rack 108 moves both racks 108 and 107.

Synchronization of the lateral mirror angle adjustment can be done manually by the turning of the knob 122 which is fixedly attached to the rotatable rod 112 on which is secured gear 105.

When gear 105 is turned by rod 112 by the knob 122, it simultaneously moves oppositely the racks 107 without moving racks 108.

An adjustable medial mask for the anterior aperture of the lateral housings is provided, (Figs. 19 and 13). This mask is in the form of a vertically rigid and horizontally flexible curtain 39. This curtain 39 is located medially of a line parallel to the optical axis of the camera lens 24 and going past the most posterior edge of the lateral mirror 25 and is just inside the plane of the front surface of the anterior aperture of the lateral housing.

Rotation of rod 38 and gear 58 Fig. 10 guides the curtain 39 by end rods 37 and small guides 59, through slots 57 parallel with the lateral housing antero-medial angle surfaces.

This curtain lateral-most edge, rod 37, is kept at a position such that an antero-posterior plane through the posterior-most edge of the lateral mirror 25 intersects rod 37 at all times, and forms a constant angle with the front surface plane of the lateral mirror 25 during its rotation. This constant angle synchronization between the curtain 39 position and the lateral mirror 25 angle to the optical axis of the camera lens 24 is provided for by a mechanical system, Fig. 13.

The said mechanical system includes eccentric gear 71 mounted fixedly on rod 26ª which is turned by rack 101 through gear 104ª synchronously with the lateral mirror 25 rotation. On one side eccentric gear 71 meshes with eccentric gear 72 (to provide a graded variable movement similar to that of the eccentric gear system for the lateral mirror), which gear 72 is fixedly mounted to rod 73 and thru said rod turns gear 75 which meshes with gear 76 thus turning rod 77 and gear 110. On the other side gears 75 and 76 and rod 73 are omitted, and eccentric gear 72 is fixedly mounted on rod 77 thus rotating with gear 110 in order to cause opposite movement of the two medial masks corresponding to the respectively oppositely rotating lateral mirrors. Rack 128 is in mesh with gear 110 and extends beyond gear 126ª which is fixedly mounted on rod 38 which in turn controls the lateral or medial masking movement of the curtain 39 through gear 58. Gear 58 is fixedly mounted on rod 38 and is in mesh with curtain 39 which has a rack means 60 horizontally mounted thereon to mesh with gear 58.

This adjustment prevents overlapping of the stereoscopic images from improper masking of the anterior aperture for the lateral mirrors as they rotate.

Separate adjustment of the curtain 39 may be made by releasing gear 126ª from mesh with rack 128, while the adjustment of curtain 39 in slots 57 is made to a new position of rod 37. This adjustment is to place rod 37 in a different plane relative to the lateral mirror 25, so that this plane between rod 37 and the posterior-most edge of the lateral mirror 25 now makes a different constant angle for synchronization with the lateral mirror 25 rotation as described previously. This adjustment prevents excessive overlapping of stereoscopic images in cameras with large lens apertures and is made accordingly bilaterally.

The central stationary housing 10 also contains the two central mirror elements 35 and 36 (Fig. 1) of an object range-finder system of which the two lateral mirrors 25 are also preferably used as a part. The two center mirrors 35 and 36 are situated in the optical axis of the camera lens 24 and are respectively arranged to receive light rays through the housings open sides 17 and 13, one from the lateral mirror 25 and the other from the other one. These mirrors 35 and 36 are situated as close to the anterior surfaces of the central stereoscopic mirrors 14 as is practical for receiving the light rays. The more posterior mirror 35 is equally reflecting and transmitting whereas the more anterior mirror 36 is totally reflecting. These mirrors are preferably front surfaced mirrors. These mirrors 35 and 36 are synchronized in opposite rotation by two gears 22 and 23 (Fig. 5) respectively which are operated by a rotatable vertical rod 27ª carrying the gear 23.

This rod 27ª (Fig. 6) extends through the top surface of the center housing where it is attached to a pointer 40 which runs over an angle scale 41. Means, not shown, may be provided to lock this pointer 40 at any desired angle of adjustment of the two mirrors 35 and 36 for the camera lens angle of view. Once this has been done, then the person taking the picture 42 can observe the degree of superimposition of images from these two mirrors 35 and 36, and can manipulate the angle of the lateral mirrors 25 until that particular object at its distance provides superimposed image rays through the range-finder system used. At this superimposition the two stereoscopic images are exactly placed side by side in the camera posterior conjugate focal plane, as of lens 24 for camera 12, or lens 196.

The stereoscopic picture taker is also provided with a viewer including a top mirror 30 (Fig. 2) mounted and at an angle facing superiorly and posteriorly over an aperture 31 in the top of the central housing 10. This mirror 30 is in line with another mirror 32 mounted facing anteriorly and superiorly within the central housing 10 and inferiorly to mirror 30. Mirror 32 is in the optical axis of the camera lens 24 and lies just anterior and as close as practical to the two center stereoscopic mirrors 14 and posterior to the more posterior of the two center range-finder mirrors 35 and 36. This mirror 30 through mirror 32 is in line with the anterior aperture 33 of the center housing whose edges provide a mask for the total angle of view of the observer's eye 42 (Fig. 6) which angle is identical then with that of the camera lens.

In order to keep this angle of the observer always equal to any camera lens total angle of view, variability of the rectangular aperture 33 is needed. This variability of the aperture 33 (Fig. 1) can be obtained by the use of suitable adjustable mask plates 43, 44, 45, and 46 which can uniformly decrease or increase the dimensions of the aperture 33. This same effect could be achieved by a static aperture 33 which could be moved at varying distances from the observer's eye, 42, thus changing the angle of view similarly. The observer's eye 42, sees an image of the object by rays coming through mirrors 30 and 32 from the object, as directed peripherally through the anterior aperture 33 of the housing 10 and centrally through the range-finder center mirrors 35 and 36. That is, the periphery of the observer's image is formed by the rays passing around the center range-finder mirrors 35 and 36 from the aperture 33, and the center of the view is formed by the superimposed range-finder image as seen reflected from the mirrors 35 and 36.

The central superimposed image tends to be slightly smaller in proportion than the peripheral image because of the greater distance the rays forming the central image traverse in passing from the object to the lateral mirrors 25 to the center mirrors 35 and 36 and thence to the observer's eye 42, in contrast to the more direct pathway through the aperture 33. Mirrors 32 and 30 then carry the combined images to the observer's eye 42.

At some convenient point in the optical axis of the viewing system a simple inverted terrestrial telescopic (Galilean) lens system 47 and 48 (Fig. 6) is placed to give a decreased image size to the observer's eye 42, for easier viewing of the total field of view simultaneously with observing the coincidence of images by the center range-finder mirrors 35 and 36. In contrast to this a reversal of this inverted telescopic form could be used for magnifying small or distant objects conveniently, especially with use of telephoto camera lenses, and thus, for example elements 47 and 48 (Fig. 7) would be reversed in order to give this effect.

This system is one of two non-parallactic ones, and in this case viewing through the range-finder mirrors 35 and 36 and the aperture 33 all in the optical axis (extended) of the camera lens 24, prevents any deviation of the observer's images from those of the camera due to parallax.

This polarizer 309 may be replaced readily by suitable means with another polarizer with no central aperture, as desired for complete stereoscopic depth appreciation by the observer in viewing at a fixed stereoscopic point of convergence.

The polarizing analyzers 308 and 309 have their polarizing planes respectively parallel in the viewed optical axis with those of polarizers 301 and 300, thus affording the images of those respective sides to the appropriate observing eye for full stereoscopic depth appreciation.

Masking of screen 303 variably by suitable means for different lens angles of view provides the observer's angle of view equal and coincident to that of the camera lens.

Polarizing screen focusing lens synchronization:

In order to keep in focus the images of an object at varying distances, the lens system 302 from the optical polarizing viewing and range-finding system (Fig. 24) which focuses the polarized rays of light going to the polarizing screen 303 must be adjustable. This adjustment is best made synchronously with the camera lens focusing system.

Thus, as in Fig. 25, the rack 453 which imparts movement to gear 187 and thus to the rest of the camera lens focusing movement, may be extended to move a similar lens focusing system for lens 302, by engaging with gear 454 which turns rod 455 and finally thru two right angled, leveled gears 455a and 455b thus turns eccentric gear 456 which then turns eccentric gear 457 to give a graded variable movement satisfactory for focusing the lens 302 antero-posteriorly, shown by arrow line 314 when gear 457 turns rod 458 and gear 459 to move antero-posteriorly rack 460, to which lens 302 is fixed.

Various mechanical synchronizations are provided between the angle of lateral mirror 25 and the adjustment of masking curtain 39 adjustment, the lateral separation of housings 16, and the lens 24 or 196 focus, for use with the visual range-finder and viewer optical system as the only criterion as to satisfactory stereoscopic images. A brief description of these systems and their functions is interposed here.

There are three basic systems for alternate use as desired for different stereoscopic picture taking purposes:

The first system, more easily designated as the lens-mirror system, is that for varying the stereoscopic angle in proportion to the changing object distance by changing the lateral mirrors 25 angle according to the object distance, while keeping the lens 24 in focus and the lateral housings 16 fixed in separation. (In other words, to maintain a fixed stereoscopic basic separation of the lateral housings 16 with a changing object distance.)

The second system, more easily designated as the housing-mirror system, is that for varying the stereoscopic angle with a fixed object distance by maintaining a static lens 24 focus on the object while the lateral housings 16 change in separation and the lateral mirrors 25 change angle to maintain the same separation of stereoscopic camera images.

A third system of synchronization, more easily designated as the lens-mirror-housing system, is that one which combines the functions of the aforementioned first and second systems, the lens-mirror and the housing-mirror systems respectively. This combination is so synchronized (Figs. 19 and 20) as to allow the use of the two component basic systems simultaneously as well as separately.

Integral to these basic systems of mechanical synchronization is the primary setting up of a lens focusing mechanism, Fig. 18, which allows translation of an even motion from or to any one of the three said systems into a graded variable movement suitable for the focusing of lens 24, Fig. 18, by rotating of the lens barrel in the camera box 12 to obtain a relative antero-posterior movement, by simple linear antero-posterior adjustment. The graded variable movement for focusing either lens type is one moving slowly for an object distance adjustment nearer from infinity and moving quickly for an object moving the same distance but at a range much closer to the camera lens. Such a variable system can be set up using eccentric gears 189 and 190 between two round gears 192 and 187, Fig. 18.

A rod 191 by means of a gear 192 may turn a screw-thread type of lens barrel provided with gear 193 (Fig. 18) and thus adjust the lens 24 in an antero-posterior direction. The rod 191 is rotated by the gear 190 in mesh with the gear 189. Rod 184 has mounted thereon the gears 181, 182, and 183, but can be disconnected from the gear 180 by pulling on knob 186.

Referring to Figure 19 there are here shown the interconnections between the mechanisms for effecting conjoint movements of the side housings 16—16 and the lateral mirror 25, between the lens 24 and the lateral mirror, and between the lens and the side housings.

Gear 182 meshes with rack 177 which is the connection of the lens gear system with the lever 154 (Fig. 17) providing changing ratio of movement between means for separating the housings 16 and the means for angularly moving lateral mirror 25 of the housing mirror system.

Gear 181 meshes with rack 132 which is the connection of the means for adjusting lens with the means for moving lateral mirror 25 in the lens-mirror system.

Gear 180 meshes with rack 148 and is the connection of the means for adjusting the lens with the means for separating housings change of the lens-housing system.

The lens-housing system is synchronized as follows:

The other two systems are adapted accordingly by letting gear 105 and knob 122 (Fig. 12) turn freely with racks 107, and pulling sleeve-lock 185a apart by knob 186a so that rotation of gear 114 will have no effect on gear 409, thus serving to neutralize the effects of the lens-housing system on the lens-mirror system; and disengaging lever 170 (Figs. 17 and 19) from notch 174 in rack 177 to release it by engaging its notch 172 by block 175 pushed up by knob 179 and rod 178 to lock therethrough stable guide 173 after notch 172 is superimposed over block 175 by turning knob 169 and thus rod 152 and gear 151 are caused to engage and move rack 150 and lever 170 until said notch 172 is over said block 175 and then spring 171 may pull the lever 170 and rack 177 together. This provides a 1:1 ratio of movement between the change of separation of the housings 16 and the angular movement of the lateral mirror 25, thus neutralizing any angular movement of the lateral mirrors 25. Sleeve lock 185 is then pushed together so that rack 148 thru gear 180 may turn rod 184 for lens-focusing. Then the lens-housing system is operated by turning knob 123 which turns rod 111 (Figs. 15 and 19). Rod 111 turns gear 125 and moves oppositely and to or from the side, the opposed racks 124 and 126 which are fixed to the lateral housings 16 respectively and which carry the lateral mirrors 25.

At the same time gear 119 is turned and this engaging with rack 159 (Figs. 19 and 25) moves it through the lens ratio lever system, against gear 162 which turns rod 113 and gear 106. Gear 106 is meshed with the opposed racks 108 and moves them oppositely, in the same respective directions as racks 124 and 126 were moved.

Racks 108 carry racks 107 with them and would rotate the gears 104 and thus, as previously described, the rods 26 and the lateral mirrors 25, but the lateral housings 16 carrying the lateral mirrors 25 are separating at the same speed as the racks 107 and no turning of gears 104 or the lateral mirrors results.

Thus the effect is achieved of no lateral mirrors 25 rotation as the housings 16 are separated.

To keep the lens in focus, the gear 147 is meshed with rack 148 which turns gear 180 (Figs. 18 and 19) and now that the knob 186 has pushed the sleeve-lock (like a watch-stem) 185 onto rod 184, rod 184 turns as a unit with gear 180 synchronizing the lens focus through the previously described lens focusing mechanism.

*Lens-mirror-housing system (LM-H system)*

The combined lens-mirror and housing-mirror systems are functionally so closely related that for the sake of clarity they shall be considered jointly in description of their main mechanical action; the separation of their individual functions being brought out later as the lens-mirror and housing-mirror systems respectively.

For use of this combined LM-H system the other system, namely that of the lens-housing system, is thrown out of gear by pulling on handle 186 (Figs. 18 and 19) thus disengaging the clutch, or sleeve-lock 185 to free rod 184 from the rotation of gear 180 so that gear 180 no longer transmits rotation thereto from the lens-housing system. Sleeve-lock 185a is engaged by pushing up knob 186a so that rod 410 rotates as a unit when gear 114 does. The lever 170 (Figs. 17 and 19) is disengaged from the block 175, and by turning knob 169 it is made to engage its knob 176 into notch 174 to transmit variable lens ratio movement on lever 154 according to the lens focus.

The difference between the rates of movement in the same direction of the grooved-together paired racks 107 and 108 respectively is indicated by the ratio levers 407 (Figs. 19 and 20) movement. The movement of this lever is determined by the difference between the movement of the rack 107 superimposed upon rack 108 and determines the amount of angular movement of the lateral mirror 25 that is to be associated with change of lens focus.

Racks 107 are in mesh with gear 421 which turns and moves in mechanical sequence rod 420, gear 433, rack 434, gear 435, rod 413a, eccentric gears 411a and 412a, rod 420a, gear 403 and rack 401. Racks 108 are meshed with gear 422 which turns to move in mechanical sequence rod 419, gear 432, rack 431, gear 430, rod 413, eccentric gears 411 and 412, rod 419a, gear 402 and rack 400. Racks 107 are thus also connected to a mechanical system, including two eccentric gears, imparting motion to rack 401.

These said eccentric gears are used to change the movement of racks 107 and 108, respectively, into a graded variable movement transmitted to racks 401 and 400 respectively. This graded variable movement is designed to compensate for the decreasing angular rotation of lever 407 as the oppositely moving racks 107 and 108, and therefore racks 401 and 400 respectively, are moved farther apart laterally. Thus, for any given distance of movement of a rack 107 or 108 there is a directly proportionate angular rotation of lever 407.

Racks 400 and 401 (Figs. 19 and 20) thus are parallel and move oppositely laterally. They are separated parallel by adequate distance for inserting a lever 407 between them. This lever 407 is attached pivotally to racks 400 and 401 at points 418, and by end pieces 405 and 406, respectively. The purpose of these end pieces is to allow fixed rods pins 414 and 415, respectively, (Fig. 20) to be inserted and to ride in slots 416 of lever 407, so that as the lever 407 changes position its effective length will not interfere with this change. Lever 407 is rotatably mounted at its center 425 on rack 408 which in turn has a pair of fixed pins 426 riding in grooves 423 of the fixed guide bar 404. This rack 408 then moves parallel to racks 107 and 108 on the guide bar 404 and causes any difference in the rate of movement between the opposed racks 400 and 401 to be transmitted to gear 409 with which rack 408 is in mesh. Gear 409 then rotates accordingly and turns rod 410 and gear 414 which is in mesh with rack 142.

Any movement of gear 114 is transmitted to rack 142 which then moves the housing separation ratio lever 137 and according to the ratio effects a corresponding movement of rack 132. Rack 132 turns gear 181 and thus the mechanical system leading to the focusing of the lens.

In explanation of said lever-rack 137, this lever has as its fulcrum a small gear 140 on rod 99. Rotation of gear 116 by rack 121 reciprocation (Figs. 16 and 19), and initially through movement of knob 123, turns said gear 140 which changes the position of lever 137 about its fulcrum, gear 140. Thus the rotation of gear 140 depends on the position of separation of the lateral housings 16 and thus the ratio of movement between racks 142 and 132 depends on the lateral housings separation.

Guide frame 138 (Fig. 16) provides support for rod 99 and spring 145 keeps the gear 140 snugly against the lever-rack 137. Slots 134 and 133 provide means for changing the lever 137 ratio without moving the racks 142 and 132. The wedge shape of lever 137 provides means of even more exactly maintaining the same relative positions of racks 142 and 132 as the point of fulcrum is changed, moving lever 137 up or down by its rods 135 and 136 in slots 133 and 134 respectively. Rack 132 then turns gear 181 which synchronizes the lens focus through the previously described mechanism.

*Lens-mirror system*

The lens-mirror system being engaged by pushing in knob 186a so that gear 114 is synchronized with gear 409 thru clutch 185a, the housing mirror system being static by locking knob 123 (the lens ratio to the housing-mirror system may be either at a static 1:1 or variable, preferably the latter by disengaging block 175 from notch 172 in lever 170 so that spring 171 (Fig. 17) may pull it down onto rack 177 and knob 169 may be turned to engage tip 176 into notch 174 to lock it there and allow variable ratio of movement in the housing-mirror system when it is again set in use), and the lens-housing system being disengaged as described previously through lock-sleeve 185, the lens-mirror system functions as follows:

Turning knob 122 rotates rod 112 and gear 105 which is engaged with racks 107 and moves them simultaneously oppositely, turning gears 104 which as previously described, finally turn rods 26 and the lateral mirrors oppositely angularly. Racks 107 move on racks 108 without causing any movement of racks 108. Since rack 107 now moves without any movement of rack 108, the focusing of the lens must then vary with this movement of rack 107 which represents a corresponding change of lateral mirrors angular movement.

*Housing-mirror system*

The lens-mirror system being passive (no active movement effected through knob 122 which is preferably left completely free and passive) and the lens-housing system being disengaged as noted previously through locking sleeve 185, and the lens-ratio set at variable for the housing-mirror system, and the lens mirror system either engaged or disengaged through locking sleeve 185ª; the housing-mirror system functions as follows:

Turning knob 123 rotates rod 111 which rotates gears 147, 117, 119 and 125. Gear 147 moves rack 148 which is now ineffective in focusing the lens because its connection is disengaged at clutch 185. Gear 117 moves rack 121 which turns gear 116, rod 99 and gear 140. Gear 140 is meshed with and moves the housing-ratio lever rack 137 to regulate the ratio of mirrors 25 angulation to lens focusing accordingly as the lateral housings 16 separation varies.

Gear 119 moves rack 159 which moves lens ratio lever rack 154 and this lever corresponding to the lens focus given ratio accordingly moves rack 161 which is in mesh with gear 162. Gear 162 moves rod 113 which similarly turns gear 106 which meshes with racks 108 and moves them oppositely in parallel relationship carrying racks 107 with them.

There is no focusing of the lens for there is no difference in the rate of movement of racks 107 and 108.

There is rotation of the lateral mirrors 25 depending upon the difference in rate of movement of the racks 107 (here moving the same as racks 108) and racks 124 and 126 moving in the same respective directions. This result occurs since the racks 124 and 126 carry the lateral housings 16 and their mirrors 25 respectively in opposite directions and the movement of the racks 107 is corresponding. Racks 107 will not be able to rotate the lateral mirrors 25 through gears 104 and 110 and rod 26 unless the speed of movement of these said housing separation racks 124 and 126 differs from that of the mirror rotating racks 107. Here said difference in speed depends upon the lens ratio lever rack 154 and thus primarily upon the lens focus, as the lateral housings 16 are moved apart, and the effect with the lens ratio lever thus variably set, is to maintain the same stereoscopic point of convergence by appropriate angular movement of the lateral mirror 25 regardless of the separation of the housings 16.

The function of the rack-lever 154 is to allow variable lever ratios between the movement of the housings 16 and angular movement of the mirrors 25. This is accomplished by a small gear 153 in mesh with the rack 155 of the lever 154. The lever 154 has as its fulcrum the small gear 153 on rod 152. Rotation of gear 153 changes the position of lever 154 upon this gear 153 which provides the fulcrum for lever 154. Rod 152 is turned by gear 151 which is turned by rack 150 (Figs. 17 and 19). Rack 150 is subject in this system to being engaged to rack 177 through lever 170 by its knob or tip 176 into notch 174. Rack 177 is moved by gear 182 which is subject to the turning of rod 184 and thus functions to the focus of the lens and its mechanical system as described previously.

Rod 152 can be turned by knob 169 to engage either block 175 into notch 172 or tip 176 into notch 174 as desired according to the system used.

Thus the position of gear 153 on rack 155 of lever 154 depends on the focus of the lens at that moment and thus the ratio movement provided by lever 154 between rack 159 and rack 161 depends on the lens focus.

Guide box 165 provides support for rod 152 and spring 166 keeps the gear 153 firmly against the rack 155 of lever 154. Slots 158 and 168 provide means for changing the lever 154 ratio without moving the racks 161 and 159 by turning gear 153. The wedge shape of lever 137 provides means of even more exactly maintaining the same relative positions of racks 159 and 161 as the point of fulcrum is changed by gear 153, thus moving lever 154 up or down by its rods 157 and 156 in slots 158 and 168 respectively; and also provides means of making a slight gradient increase in the ratio of the angular movement of the mirror as the separation of the lateral housings increases.

Rack 161 moving in its long axis then turns gear 162 which turns rod 113 and turns gear 106. Gear 106 turns racks 108 which respectively carry racks 107 with them to turn gears 104 and thus the rods 26 and mirrors 25 through the previously described systems.

An adjustment system mechanically arranged for accurate axial alignment of the camera lens and the stereoscopic adapter optical systems is afforded (Fig. 9). The camera is mounted on section 201 of the uppermost bar by thumbscrew 217 through hole 200. Section 202 of this bar rigidly supports part 201 on part 203 which is secured to part 205 of the right angled bar beneath by an adjustable clamp 204 such that antero-posterior adjustment as indicated by the arrow 218, may be made. Section 205 is fixed by a tripod or other support mounted through thread hole 206 and the extension 207 is opposed by bar 209 which is adjustable by variable clamp 208 to an infero-superior direction, as indicated by arrow 219.

Section 211 is attached to 209 and on it is mounted a plate 212 which has a slot 213 running laterally for its full length, through which slot screws pass from holes 210 of plate 211 to thread into holes 215 of plate 216 and provide variable movement of plate 212 between plates 211 and 216 by movement of screws from holes 210 to 215 through slot 213 laterally, as indicated by the arrow 220.

Section 221 of plate 212 provides for attachment to the center housing 10 of the stereoscopic adapter through its base plate 20 by bolting through holes 214 into the base plate 20 at its center. Thus movement in all directions is possible to secure satisfactory alignment of the camera lens 24 with the stereoscopic adapter optical system thru aperture 11.

This said axial adjustment system for the camera lens, in order to provide easier means of antero-posterior movement of the camera boxes to permit a fixed position of the lens relative to the stereoscopic picture taker, is provided with an alternative plate 225 (Fig. 11) for mounting upon section 201 by thumb screw 217 through hole 200. This system is a composite one allowing smooth and low friction antero-posterior movement of the camera box relative to section 201. This said movement is accomplished by the movement of plate 228 on plate 225 by means of ball bearings 227 moving in grooves on one plate and fixed to the other plate by retainers (not shown) which does not restrain the rotation of these ball bearings. The camera box weight is centrally balanced upon this plate 228 for reasons of smoother movement by antero-posterior adjustment bar 229 and lateral adjustment bar 234 which provide holes 232 for fastening bar 234 to the camera box by a screw 233 similar to 217, and bar 234 through holes 230 to plate 228 by screw 231. This said composite plate allows simple antero-posterior movement of camera box 12 as previously described. A binocular viewing box 371 (Fig. 22) serves as a housing for the mirror viewing system and allows viewing parallel to the optical axis of the camera lens 24.

Exterior light is prevented from entering the housings of the stereoscopic adapter except at the anterior apertures of the lateral housings 16, the anterior aperture 33 of the center housing 10, and the observing aperture 31 in the superior side of the center housing 10. From the movable housings 16 medial apertures to the central housing lateral apertures, bellows 49 (Fig. 2) are placed to keep the external light out and the apertures 13 and 17 unobstructed. All other areas are covered by light opaque substances, preferably of firm consistency suitable to give the apparatus permanent shape. A light shade extensible between the aperture 11 and the camera lens mount is provided to keep extraneous light from the apparatus at that point. A hooded tube with eye-pieces for viewing by the observer of the images from the superior viewing aperture 31 is preferred, and may be modified into the polarizing analyzer device for viewing polarized stereoscopic images as in the system previously described and illustrated.

Having thus described my invention, what I claim as new, and desire to secure by United States Letters Patent is:

1. A stereoscopic adapter, according to the specification, comprising a central stationary housing having a posterior aperture for engaging upon a camera lens and box in axial alignment and having open sides, said camera lens being maintained static in said posterior aperture and protected from external light, two center picture-taking mirrors with planes at right angles to each other and respectively 45 degrees to the optical axis of the camera lens with their reflecting surfaces directed posteriorly and laterally and fixedly mounted within said housing along the optical axis of the camera lens with their contacting edges extending vertically, side housings open anteriorly and disposed laterally to said central housing and having their medial sides open and in line with the correlated central housing open sides, said medial sides being joined by a light-proof variably extensible structure, mechanism including racks connected to said side housings and a gear in mesh with said racks for shifting said side housings with respect to the center housing, and means for preventing center overlap of stereoscopic picture images, including a mask at the medial side of each lateral housing anterior aperture, each of said masks being adjustable over its correlated side housing front for said purpose and accordingly synchronized by means of said rack and gear mechanism with the lateral housing mirror angulation respectively, and also adjustable for different camera lens apertures as desired, and two side picture-taking mirrors mounted one in each of said side housings and set with their reflecting surfaces anteriorly and medially directed relative to the optical axis of said camera lens and placed with their posterior edges lateral to the contacting edges of said two center picture taking mirrors and forming an angle variable from a maximum of 45 degrees to a minimum of 0 degrees to the optical axis of said camera lens and means for varying the angles of said side mirrors separately and means for varying the angles of said side mirrors simultaneously.

2. A stereoscopic adapter, according to the specification, comprising a central stationary housing having a posterior aperture for engaging upon a camera lens and box in axial alignment and having open sides, said camera lens being maintained static in said posterior aperture and protected from external light, two center picture-taking mirrors with planes at right angles to each other and respectively 45 degrees to the optical axis of the camera lens with their reflecting surfaces directed posteriorly and laterally and fixedly mounted within said housing along the optical axis of said camera lens with their contacting edges extending vertically, side housings open anteriorly and disposed laterally to said central housing and having their medial sides open and in line with the correlated central housing open sides, said medial sides being joined by a light-proof variably extensible structure, and means for preventing center overlap of stereoscopic picture images, including a mask at the medial side of each lateral housing anterior aperture, each of said masks being adjustable over its correlated side housing front for said purpose and accordingly synchronized by means of a rack and gear device with the lateral housing mirror angulation respectively, and also adjustable for different camera lens apertures as desired, means for simultaneously adjusting said side housings towards and away from said central housing comprising racks connected to the side housings and an operating gear meshing with said racks, and two side-picture taking mirrors mounted one in each of said side housings and set with their reflecting surfaces anteriorly and medially directed relative to the optical axis of said camera lens and placed with their posterior edges lateral to the contacting edges of said two center picture taking mirrors and forming an angle variable from a maximum of 45 degrees to a minimum of 0 degrees to the optical axis of said camera lens and means for varying the angles of said side mirrors separately and means for varying the angles of said side mirrors simultaneously, said last mentioned means having a part adapted to coact with the said camera lens for synchronizing said varying of said side mirror angles with the focusing of said lens for varying distances of separation of said side housings and for varying object distances.

3. In an attachment for photographic cameras, a base, a central housing having open sides fixed on said base and adapted to receive in its rear wall a camera lens, means forming a viewing aperture in the front wall, a pair of side housings mounted on said base on the opposite sides of said central housing and transversely slidable on the base with respect thereto, angularly positioned mirrors in said housing forming part of an optical axis intermediate the camera lens and the viewing aperture, and linkage connected to said side housings for shifting the latter transversely of the base with respect to the central housing.

4. In an attachment for photographic cameras, a base, a central housing having open sides fixed on said base and adapted to receive in the rear wall a camera lens, means forming a viewing aperture in the front wall, a pair of side housings mounted on said base on opposite sides of said central housing and transversely shiftable with respect thereto, means pivotally mounting mirrors in said side housings at right angles to the base, said mirrors in said housings forming part of an optical axis intermediate the camera lens and the viewing aperture, and mechanical linkage interconnecting the pivotal mounting means for the mirrors for conjoint operation.

5. In an attachment for photographic cameras, a base, a central housing having open sides fixed on said base and adapted to receive in its rear wall a camera lens, means forming a viewing aperture in the front wall, a pair of side housings mounted on said base on the opposite sides of said central housing and transversely slidable with respect thereto, means pivotally mounting mirrors in said housings at right angles to the base, said mirrors in the side housings forming part of an optical axis intermediate the camera lens and the viewing aperture, mechanical linkage interconnecting the pivotal mounting means for the mirrors for conjoint operation, said mechanical means including an independent control for individual adjustment of one of said mirrors.

JOHN MARK RICHARDS.

REFERENCES CITED

The following references are of record in the file of this patent:

UNITED STATES PATENTS

| Number | Name | Date |
|---|---|---|
| 1,655,850 | Watts | Jan. 10, 1928 |
| 1,864,445 | LeBarbier | June 21, 1932 |
| 2,168,273 | Sauer et al. | Aug. 1, 1939 |
| 2,299,002 | Austin | Oct. 13, 1942 |
| 2,303,742 | Howells | Dec. 1, 1942 |
| 2,365,212 | Oriol | Dec. 19, 1944 |
| 2,413,996 | Ramsdell | Jan. 7, 1947 |